(12) United States Patent
Bellomare et al.

(10) Patent No.: US 12,022,846 B2
(45) Date of Patent: *Jul. 2, 2024

(54) MIXING DEVICE

(71) Applicant: DE' LONGHI APPLIANCES S.R.L. CON UNICO SOCIO, Treviso (IT)

(72) Inventors: Filippo Bellomare, Treviso (IT); Alessandro Benedetti, Treviso (IT); Andrea Moro, Treviso (IT)

(73) Assignee: DE' LONGHI APPLIANCES S.R.L. CON UNICO SOCIO, Treviso (IT)

( * ) Notice: Subject to any disclaimer, the term of this patent is extended or adjusted under 35 U.S.C. 154(b) by 892 days.

This patent is subject to a terminal disclaimer.

(21) Appl. No.: 17/058,120

(22) PCT Filed: May 21, 2019

(86) PCT No.: PCT/IT2019/050112
§ 371 (c)(1),
(2) Date: Nov. 23, 2020

(87) PCT Pub. No.: WO2019/224856
PCT Pub. Date: Nov. 28, 2019

(65) Prior Publication Data
US 2021/0195914 A1 Jul. 1, 2021

(30) Foreign Application Priority Data
May 21, 2018 (IT) .................... 102018000005555

(51) Int. Cl.
*A47J 43/07* (2006.01)
*A23G 9/12* (2006.01)
(Continued)

(52) U.S. Cl.
CPC ............... *A23G 9/12* (2013.01); *A23G 9/224* (2013.01); *A47J 43/0711* (2013.01);
(Continued)

(58) Field of Classification Search
CPC ................................... A47J 43/0711
(Continued)

(56) References Cited

U.S. PATENT DOCUMENTS 3,067,988 A * 12/1962 Rodoz ...................... B03D 1/16
210/219
5,865,539 A * 2/1999 Rogers .................... B01F 27/96
416/227 R
(Continued)

FOREIGN PATENT DOCUMENTS

EP 0 179 027 A2 4/1986
EP 0 596 221 A1 5/1994
(Continued)

OTHER PUBLICATIONS

International Search Report and Written Opinion for PCT/IT2019/050112, mailed Aug. 28, 2019.

*Primary Examiner* — David L Sorkin
(74) *Attorney, Agent, or Firm* — MARSHALL, GERSTEIN & BORUN LLP

(57) ABSTRACT

A mixing device suitable to mix substances or liquid or semi-liquid compounds to increase the volume thereof, including a hub which develops along a central axis and three mixing spokes connected to the hub, wherein each of the spokes comprises an external lateral fin and two upper and lower connection segments, which connect respective upper and lower ends of the lateral fin to the hub.

15 Claims, 3 Drawing Sheets

(51) Int. Cl.
   *A23G 9/22*     (2006.01)
   *B01F 27/072*   (2022.01)
   *B01F 27/091*   (2022.01)
   *B01F 27/13*    (2022.01)
(52) U.S. Cl.
   CPC ........ *B01F 27/0723* (2022.01); *B01F 27/091* (2022.01); *B01F 27/13* (2022.01)
(58) Field of Classification Search
   USPC .......................... 366/312, 313, 325.7, 325.8
   See application file for complete search history.

(56) References Cited

U.S. PATENT DOCUMENTS

| | | | | |
|---|---|---|---|---|
| 2006/0062078 | A1* | 3/2006 | Jejcic | B01F 27/091 |
| | | | | 366/310 |
| 2007/0140053 | A1* | 6/2007 | Jejcic | B01F 27/091 |
| | | | | 366/311 |
| 2021/0112825 | A1* | 4/2021 | Bellomare | A23G 9/22 |

FOREIGN PATENT DOCUMENTS

| | | |
|---|---|---|
| EP | 1 787 713 A1 | 5/2007 |
| EP | 3 222 150 A1 | 9/2017 |
| FR | 2 216 011 A1 | 8/1974 |
| FR | 2 218 133 A1 | 9/1974 |
| GB | 371406 A | 4/1932 |
| WO | WO-2016/092486 A1 | 6/2016 |

\* cited by examiner

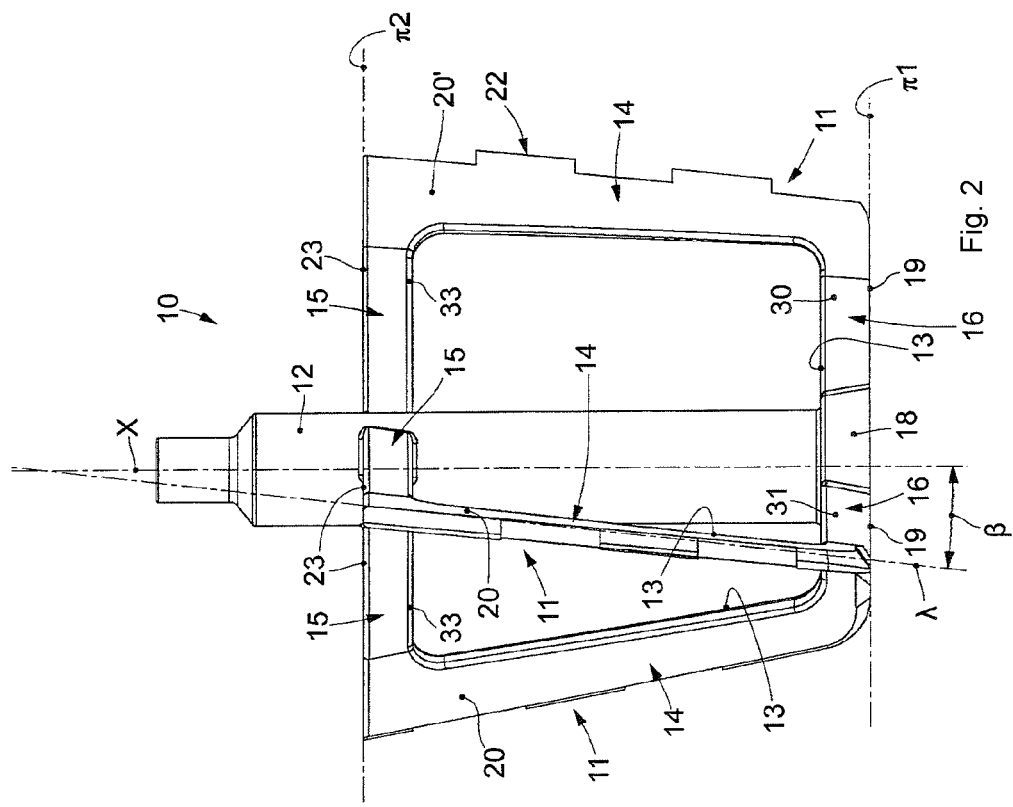
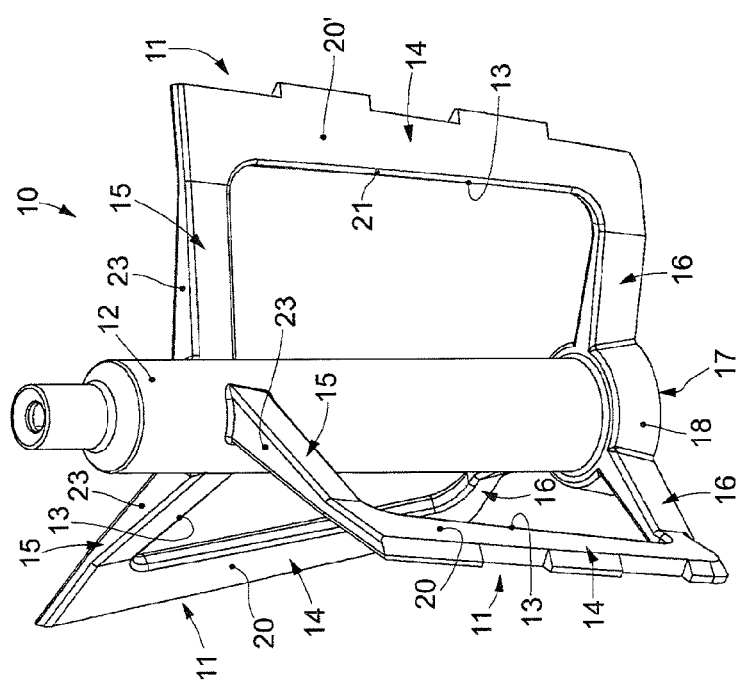

MIXING DEVICE

FIELD OF THE INVENTION

The present invention concerns a mixing device, advantageously, although not exclusively, intended for preparing and whisking ice cream, being suitable to volumize liquid or semi-liquid substances, for example milk, eggs, and suchlike, by introducing into the substance as much air as possible so as to increase its volume and obtain a compound with a homogeneous and creamy consistency.

BACKGROUND OF THE INVENTION

Equipment is known which is provided with whisk mixing devices and/or machines provided with a container with an internal rotating mixing device for beating liquid or semi-liquid compounds such as for example milk and/or eggs.

Mixing devices are also known associable with machines to produce and/or whisk ice cream, configured to mix the compound while it is cooled with a suitable cooling circuit, to incorporate air inside it and increase its volume.

The conformation of known mixing devices is normally whip-like, or helicoidal, or with a flat extension, that is, extending three-dimensionally, and have a drive shaft cooperating with a motor member.

Mixing devices with one or more spokes, or mixing blades, are also known, and different types of spokes, or mixing blades, are also known.

During the ice-cream production process it is a disadvantage that the compound often remains on the walls of the container without being properly mixed.

If the compound is not removed from the walls of the container regularly, and with continuity, the part in contact with the cooled surface of the latter tends to freeze, giving as a result a non-homogeneous and not very creamy compound.

Another disadvantage is that the compound is not sufficiently volatized.

In fact, it is desirable to considerably increase the volume of the initial compound, also defined in the field as "overrun", which on the one hand confers a high degree of softness and creaminess to the ice cream, and on the other increases the yield of the raw materials, increasing the overall profit.

In the state of the art, solutions are known which have tried at least in part to solve the problems indicated above.

From FR-A-2.218.133 a mixing device is known comprising a central hub and three spokes angled with respect to the central hub, disposed in a helical shape around the hub in a substantially cylindrical area. The mixing device described therein also comprises a plurality of suction cups, disposed aligned along each spoke, which, during use, are compressed against the internal surface of a cooling tub, adhering to it to remove the layer of compound which deposits on the surface.

Other examples of mixing devices suitable to be used in association with cylindrical containers are known from FR-A-2.216.011, EP-A-0.596.221, EP-A-3.222.150 and GB-A-371.406. The solutions described in these documents provide a conformation of the spokes which does not allow to obtain a suitable contact of the compound with the cooled walls, and therefore an effective heat exchange with the evaporator, also taking into account the cylindrical shape of the container in which they are disposed during use.

One purpose of the present invention is to provide a mixing device which allows to obtain an efficient and effective removal of the compound from the walls of a container.

Another purpose is to provide a mixing device which allows to obtain a large increase in the volume of the compound, and therefore a high overrun.

Another purpose is to provide a mixing device which allows to mix the compound homogeneously and uniformly, avoiding the formation of ice crystals which are too large, and obtain a smooth and soft final product.

The Applicant has devised, tested and embodied the present invention to overcome the shortcomings of the state of the art and to obtain these and other purposes and advantages.

SUMMARY OF THE INVENTION

The present invention is set forth and characterized in the independent claims, while the dependent claims describe other characteristics of the invention or variants to the main inventive idea.

The present invention concerns a mixing device, or mixing blade, suitable to beat liquid, semi-liquid and doughy substances, to increase the volume thereof.

The mixing device according to the invention is particularly suitable to be used to produce ice cream, to beat liquid or semi-liquid substances, such as for example milk, eggs and possibly other ingredients, and whisk the obtained compound, to obtain an ice cream with a homogeneous and creamy consistency.

The mixing device can also be applied to a shaft blender and inserted into any container.

Furthermore, the mixing device can also be used in a machine to prepare ice-cream comprising a container in which to dispose the ingredients, a cooling circuit to cool the container, a motor member to rotate the mixing device around its central axis, and a structure to support and position the whole.

The ice cream machine can preferably be a domestic, or semi-professional, machine.

The mixing device is conventionally connectable to a drive shaft of the motor to be rotated around a central axis.

The present invention also concerns both mixing devices which are associated with at least a part of the drive shaft, and also mixing devices which are detachable from the drive shaft in any way (screwing, joint, mixed connection, etc.).

According to the invention, the mixing device comprises a central hub and three mixing spokes connected to the hub.

According to some embodiments, at least one of the mixing spokes lies at least in part on a first lying plane skewed with respect to the central axis; that is, a first lying plane that does not contain the central axis.

According to some embodiments, the position of said first lying plane can be right-hand or left-hand.

According to a further variant of the invention, some spokes of the mixing blade have a skewed positioning in one direction and/or in the other, and others have a lying plane coherent with the central axis.

The spokes of the blade can lie, if they are skewed, on different planes defined by different angles of inclination with respect to the axis of rotation.

According to some embodiments, the spokes comprise an external lateral fin and two connection segments, upper and lower, which connect the respective upper and lower ends of the lateral fin to the hub. The lateral fins and the respective upper connection segments lie on skewed planes, that is, inclined with respect to each other and/or with respect to the central axis.

The angle between the respective connection segments, upper and lower, determines a helical shape of the spokes.

According to some embodiments, the spokes develop, with respect to the central axis, in a truncated cone-shaped volume, and the respective external edges of the lateral fins lie on a common truncated cone-shaped surface.

The truncated cone-shaped surface is flared between the lower connection segment and the upper connection segment.

According to some embodiments, the truncated cone-shaped surface can have a flaring angle comprised between 1 and 15° with respect to the central axis.

According to some embodiments, this conformation makes the use of the mixing device according to the invention suited to ice cream machines with truncated cone-shaped containers, which allow better contact and therefore heat exchange with evaporators with a mating truncated cone shape.

Furthermore, the device according to the invention is particularly suitable in the case of machines for preparing ice cream with a substantially horizontal axis of rotation, as the truncated-cone geometry of the spokes allows to obtain a complete and easy extraction of the compound at the end of the preparation.

According to some embodiments, one or more lateral fins lie on respective vertical lying planes inclined with respect to the central axis of the mixing device by an angle of vertical inclination comprised between 2° and 10°.

Providing an angle of vertical inclination with a small value allows to maintain the compound in greater contact with the cooling wall and therefore to accelerate the freezing speed. This is particularly effective when the mixing device is used in a machine to produce ice cream with a substantially horizontal axis of rotation, that is, inclined with respect to the horizontal by an angle comprised between 1° and 20°.

This conformation also allows to modify the direction of rotation of the mixing device, and therefore of the spokes, without destructuring the mixed compound, making the mixing device suitable to also be used to produce products other than ice cream, such as for example sorbets.

Furthermore, the possibility of changing the direction of rotation of the mixing device without ruining the compound allows to easily unblock the mixing device in the event that it blocks, for example due to excessive cooling of the cooled walls, and therefore excessive freezing of the compound inside it.

According to the invention, the spokes have a through aperture delimited by the connection segments, the lateral fin and the hub, through which, during use, the compound to be mixed can pass.

The upper and/or lower segments of the spokes, according to the invention, can be both orthogonal with respect to the central axis and also have, one and/or the other of the segments, a positive or negative angle.

According to a variant, the connection means are present only around one end of the spoke of the mixing blade, with possible connection fittings.

According to a further variant, the connection means are positioned in an intermediate position, with stiffening fittings possibly being provided.

According to some embodiments, the upper and lower connection segments of a spoke are angled with respect to each other by an angle of horizontal inclination comprised between about 10° and about 25° with respect to the central axis.

Therefore, the upper and lower end parts of the spokes, that is, each part of the upper and lower connection segments can have its own angle with respect to the radial axis According to some embodiments, the lower connection segment extends substantially in a radial direction with respect to the axis of rotation, and the upper connection segment extends angled with respect thereto.

According to some embodiments, at least one spoke is provided with grooves and/or extensions made in an external edge of the lateral fin, configured to promote the generation of bubbles with small sizes, and incorporate as much air as possible into the compound, so as to increase the volume and therefore the overrun of the compound itself and make it creamy.

According to some embodiments, two spokes are provided with grooves in reciprocally offset positions to facilitate the formation of air bubbles with small sizes, and at the same time allow the removal of the compound from the walls of the tub or container.

According to further embodiments, the third spoke can have an external edge with a profile corresponding to the internal surface of the tub in which it is disposed during use, so as to increase the removal action of the compound therefrom.

According to variant embodiments, all three spokes are provided with grooves in the respective lateral fins.

Advantageously, if the grooves are provided on at least two spokes, the grooves will be located offset with respect to each other along the longitudinal development of the respective lateral fins, so that they follow autonomous circumferential paths.

According to variant embodiments, the corners can be obtained by making one or more extensions on an external edge of the lateral fin.

According to some embodiments, the grooves and/or the extensions define corners with squared angles, that is, not rounded.

According to some embodiments, the extensions can have a pyramid shape and/or a rectangular or square shape, that is, similar or comparable.

In the case of a pyramid-shaped extension, each pyramid achieves an external corner and possibly two corners at the base.

In the case of rectangular or square extensions, they achieve two external corners and possibly two corners at the base.

According to variant embodiments, the upper and lower connection segments can be angled with respect to the respective lateral fin, defining between them respective included angles that can be equal to one another or different from one another. This conformation allows to confer discontinuity to the mass of the compound to be mixed, preventing it from stratifying on the spoke, and thus allowing to obtain a more homogeneous and uniform compound.

BRIEF DESCRIPTION OF THE DRAWINGS

These and other characteristics of the present invention will become apparent from the following description of some embodiments, given as a non-restrictive example with reference to the attached drawings wherein:

FIG. 1 shows a three-dimensional view of an example form of a mixing device according to an embodiment described here;

FIG. 2 shows a view from one side of the mixing device of FIG. 1;

Figure 4:
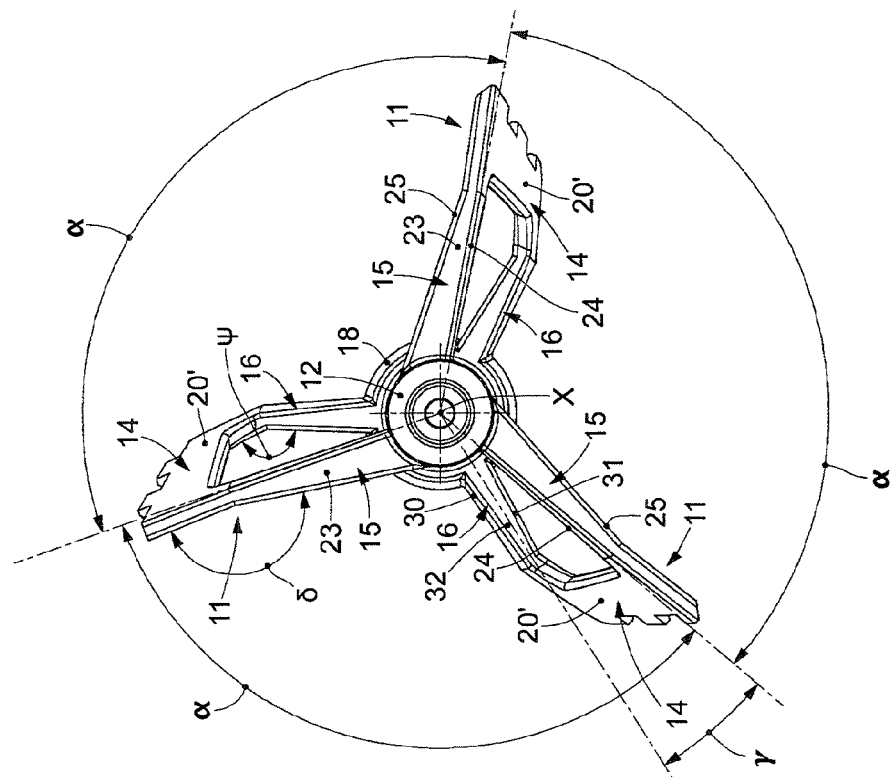
FIG. 4 shows a view from above of the mixing device according to embodiments described here.
Figure 3:
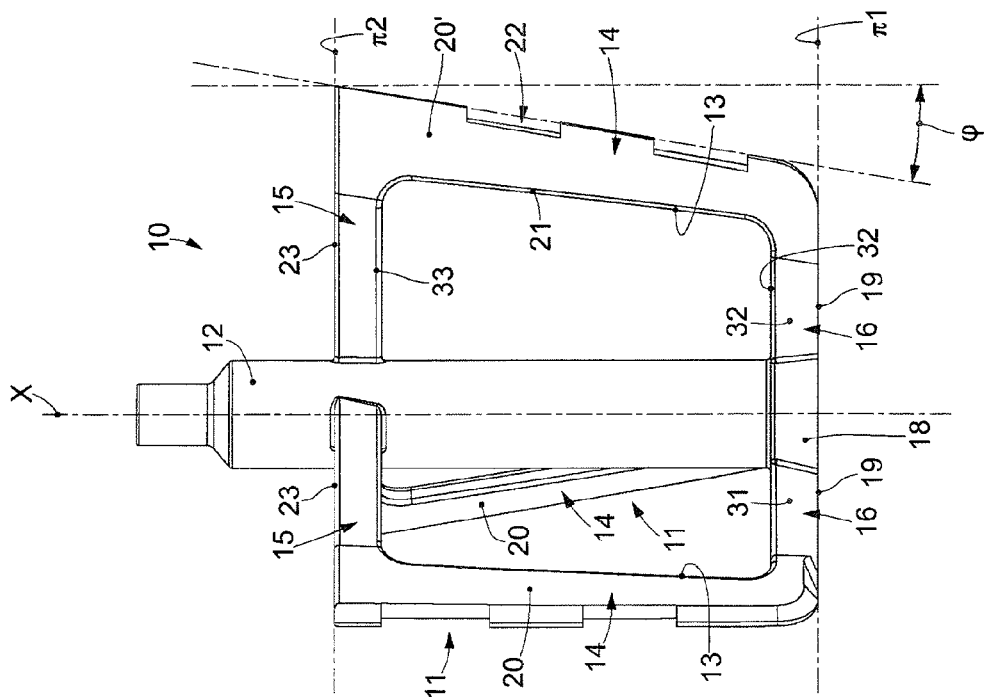
FIG. 3 shows a lateral view from a different side of the mixing device of FIGS. 1 and 2.

FIGS. from 5 to 7 show details respectively of the three spokes of the mixing device according to embodiments described here.

To facilitate comprehension, the same reference numbers have been used, where possible, to identify identical common elements in the drawings. It is understood that elements and characteristics of one embodiment can conveniently be incorporated into other embodiments without further clarifications.

DETAILED DESCRIPTION OF SOME EMBODIMENTS

We will now refer in detail to the various embodiments of the present invention, of which one or more examples are shown in the attached drawings. Each example is supplied by way of illustration of the invention and shall not be understood as a limitation thereof. For example, the characteristics shown or described insomuch as they are part of one embodiment can be adopted on, or in association with, other embodiments to produce another embodiment. It is understood that the present invention shall include all such modifications and variants.

Embodiments described here with reference to the attached drawings concern a mixing device, or mixing blade 10, of the type suitable to be used to mix liquid or semi-liquid substances, or compounds, and to incorporate air therein to increase their volume.

The mixing device 10 is, in particular, suitable to be applied in an ice cream machine (not shown) provided with a container, or tub, inside which the ingredients to be mixed are located, and a cooling circuit suitable to cool the walls of the container, and therefore the substances or compounds in contact therewith.

According to some embodiments, the mixing device 10 comprises three mixing spokes, or blades, 11a, 11b, 11c, also indicated as a whole with the reference number 11.

The mixing device 10 comprises a hub 12 configured to be connected to a drive shaft of a motor member and to be rotated by the latter around a central axis X.

According to some embodiments, the spokes 11 are connected to and extend from the hub 12.

According to some embodiments, the three spokes 11 are disposed equally distanced with respect to the central axis X, that is, they are disposed at an angle α of 120° with respect to each other.

The drawings do not show either the container inside which the mixing device 10 operates during use, or the motor member which rotates the hub 12 of the mixing blade 10 around the central axis X.

According to some embodiments, the mixing device 10 is detachable from the drive shaft and removable from the container for hygiene reasons, so as to allow an adequate cleaning thereof.

According to some embodiments, the hub 12 is hollow and has a tubular shape provided with at least a first aperture 17 through which a drive shaft can pass which can rotate the hub 12.

According to some embodiments, the hub 12 comprises a base portion 18 with a diameter greater than the mean diameter of the hub 12, suitable to be put in contact with the bottom of a tub, or container for the ingredients, so as to prevent the compound from accumulating in the central portion, and therefore not being mixed in a suitable manner.

According to some embodiments, the mixing spokes 11 comprise an external lateral fin 14, and two connection segments, an upper connection segment 15 and a lower connection segment 16, which connect respective ends of the lateral fin 14 to the hub 12.

According to some embodiments, each mixing spoke 11 defines a through aperture 13, delimited by the connection segments 15, 16, by the external lateral fin 14 and by the hub 12, through which the compound to be mixed can pass.

According to some embodiments, the through aperture 13 can take any shape desired.

According to some embodiments, the lateral fins 14 and the respective upper 15 and lower 16 connection segments develop along respective axes of longitudinal development that are skewed, that is, inclined with respect to each other and/or with respect to the central axis X.

According to some embodiments, the mixing spokes 11 are C-shaped.

The angle between the respective upper 15 and lower 16 connection segments determines a helical shape of the spokes 11.

According to some embodiments, the spokes 11 are configured so that the respective external edges 22 of the lateral fins 14 lie on a truncated cone-shaped surface, flared toward the upper connection segment 15.

This conformation of the lateral fins 14, inclined toward the outside, makes them suitable to adapt to a container with a truncated cone shape.

The inclination of the external edges 22 can be correlated to the inclination and to the flaring of the lateral walls of the container with which they have to cooperate during use, so that the spokes 11 can efficiently remove the compound from the lateral walls.

According to some embodiments, the truncated cone-shaped surface can have a flaring angle comprised between 1 and 15° with respect to the central axis X.

By way of example, the external edge 22 of one, or each spoke 11 can be inclined by a flaring angle φ for example comprised between 0° and 15°, preferably between 5° and 10° with respect to the central axis X.

According to some embodiments, the lower connection segments 16 are connected to the hub 12 in correspondence with the base portion 18.

According to some embodiments, the lower connection segments 16 of the three spokes 11 have respective flat lower surfaces 19 which are made in continuity with the lower surface of the base portion 18 and all lie on a first common lying plane π1.

According to some embodiments, the lower connection segments 16 have a first 30 and a second 31 side which extend in a direction transverse to the flat lower surface 19, and an upper surface 32 which partly delimits the through aperture 13.

In this way, during use, the lower connection segments 16 can remove the compound that accumulates in correspondence with a bottom wall of the container, allowing a more effective mixing which confers greater homogeneity to the final compound.

According to some embodiments, the upper connection segments 15 can be connected to the hub 12 in correspondence with an upper portion thereof.

By way of example, the upper connection segments 15 can be connected to the hub 12 in a position comprised between about ⅔ and about ¾ of its overall length with respect to the first lying plane π1 of the base portion 18 and of the flat lower surfaces 19.

In this way, the upper connection segments 15 also contribute to the mixing of the compound and of the substances, increasing the overall efficiency of the mixing device 10.

According to further embodiments, the upper connection segments 15 can be connected to the hub 12 in correspondence with its upper end opposite the base portion 18, and be configured to remove the compound in correspondence with a lid to close the container in which the mixing device 10 is inserted and enclosed.

According to some embodiments, at least one mixing spoke 11 is skewed with respect to the central axis X, that is, it lies at least in part on a lying plane which does not include the central axis X.

According to some embodiments, at least one mixing spoke 11 has at least one angle of vertical inclination β and at least one angle of horizontal inclination γ.

According to some embodiments, the three mixing spokes 11 are consequential and all have the same angles of vertical β and horizontal γ inclination.

According to possible variants, at least one spoke 11 can have an angle of vertical β and/or horizontal γ inclination different from the other spokes 11.

According to some embodiments, the lateral fins 14 lie on a first vertical lying plane λ skewed with respect to the central axis X.

According to some embodiments, the first vertical lying plane λ is inclined with respect to the axis of rotation by an angle of vertical inclination β comprised between 2° and 10°.

According to other embodiments, the angle of vertical inclination β can be comprised between 4° and 8°.

The smaller the angle of vertical inclination β, the greater the action performed by the lateral fins 14, during use, to keep the compound in contact with the cooled walls of the container, acting substantially as a spatula, so as to increase the heat exchange between the compound and the cooled wall of the container and consequently reduce the preparation time of the ice cream.

According to embodiments described with reference to the attached drawings, the angles of vertical inclination β are right-hand.

According to possible variants, not shown, the angles of vertical inclination β are left-hand.

The reduced angles of vertical inclination β also allow to invert the direction of rotation of the mixing device 10 without destructuring or damaging the compound being worked.

According to some embodiments, the lateral fins 14 have respectively an internal edge 21 which delimits the through aperture 13, an external edge 22, opposite the internal edge 21 and suitable to cooperate, during use, at least partially, with the lateral surface of a container, or tub, for the substances or the compound to be mixed, and two lateral surfaces 20, 20' which connect the two edges 21, 22 to each other.

According to some embodiments, the vertical lying plane λ can be the plane on which at least one lateral surface 20, 20' lies.

According to further embodiments, the lateral surfaces 20, 20' lie on respective first vertical lying planes λ parallel to each other.

According to some embodiments, the external lateral fins 14 have a substantially uniform thickness along a longitudinal development thereof.

According to variant embodiments, the lateral fins 14 can have an external lateral portion with a thickness decreasing toward the external edge 22.

According to some embodiments, the lower connection segments 16 have a tapered shape with a thickness decreasing from the hub 12 toward the respective lateral fin 14.

According to some embodiments, the lower connection segments 16 in a plan view from above can have a shape substantially symmetrical with respect to a median axis M.

According to some embodiments, the median axis M extends in a substantially radial direction with respect to the central axis X, that is, substantially orthogonal thereto.

According to some embodiments, one or more of either the upper connection segments 15 and/or the lower connection segments 16 have a tapered shape between the hub 12 and the lateral fin 14.

The tapered and discontinuous shape allows to create discontinuities in the compound as well, improving the mixing action.

According to some embodiments, the upper connection segments 15 have a first side 24 disposed substantially in a radial direction to the central axis X, and a second side 25, opposite the first side 24, and disposed inclined with respect thereto, joined together by respective upper 23 and lower 33 surfaces.

The second side 25 can be disposed, for example, substantially tangent to an external surface of the hub 12.

According to some embodiments, the upper surfaces 23 of all three spokes 11 lie on a second common lying plane π2.

According to some embodiments, the first and second lying planes π1, π2 are parallel to each other.

According to some embodiments, the upper 15 and lower 16 connection segments of a same spoke 11 are angled with respect to each other by the angle of horizontal inclination γ.

According to some embodiments, the angle of horizontal inclination γ can be correlated to, and vary as a function of, the amplitude of the angle of vertical inclination β and the longitudinal length of the lateral fin 14.

For example, the angle of horizontal inclination γ can be measured on a plane orthogonal to the central axis X as the angle included between the median line M of the lower connection segment 16 and the first side 24 of the upper connection segment 15, both substantially radial with respect to the central axis X.

According to some embodiments, the angle of horizontal inclination γ is comprised between about 15° and about 25°.

According to variant embodiments, the angle of horizontal inclination γ is comprised between about 18° and about 22°.

According to another variant, the angle of horizontal inclination γ is about 20°.

According to some embodiments, the upper connection segment 15 is offset in a counterclockwise direction by an angle of horizontal inclination γ with respect to the lower connection segment 16.

According to this solution, during the rotation of the mixing device 10 around the central axis X in a counterclockwise direction, the lower connection segment 16 follows the upper connection segment 15.

According to variant embodiments, the upper 15 and lower 16 connection segments can be angled with respect to the respective lateral fin 14, defining with respect to each other respective included angles δ, ψ equal to, or different from each other.

By way of example, the included angles δ, ψ can vary between 150° and 180°.

The included angles δ, ψ between the fins 14 and the respective connection segments 15, 16 allow to confer discontinuity to the mass of the compound to be mixed, preventing it from becoming stratified on the spoke 11, so as to obtain a more homogeneous and uniform compound.

According to some embodiments, the upper included angle δ between the second side 25 of the upper connection segment 15 and the adjacent lateral surface 20 of the respective lateral fin 14 is greater than the lower included angle ψ between the second side 31 of the lower connection segment 16 and the same lateral surface 20 of the lateral fin 14, for example by a difference correlated to the amplitude of the angle of vertical inclination β.

According to some embodiments, at least one spoke 11 is provided with grooves 26 made in correspondence with the external edge 22 of the lateral fin 14 and configured to promote the generation of air bubbles with small sizes, which can be incorporated into the compound during the mixing process.

The grooves 26 allow to incorporate as much air as possible into the compound to increase its volume.

The grooves 26 are separated by protruding portions, or extensions 27, the ends of which define the portions of the external edge 22 configured to cooperate, during use, with the walls of a container, or tub.

According to some embodiments, the protruding extensions 27 can have a constant thickness.

According to variant embodiments, the protruding extensions 27 can have a decreasing thickness toward the external edge 22.

According to further variant embodiments, the lateral surface of the external edge 22 can be skewed and oblique with respect to the first lying plane of the lateral fin 14, so as to facilitate the removal of the compound from the walls of the container, or tub.

The cooperation of the grooves 26/extensions 27 with the walls of a container, or tub, determines the formation of passage channels 28 which, during the rotation of the mixing device, determine the generation of the air bubbles.

According to some embodiments, the corners 29 of the passage channels 28 defined by respective grooves 26 and extensions 27 are squared, so as to create discontinuities suitable to generate bubbles of small sizes, which mixing with the compound, increase its volume, allowing to obtain a soft and creamy final product.

According to possible variants, the corners 29 can be at least partly rounded.

According to further embodiments, two spokes 11 can be provided with grooves 26 and corresponding passage channels 28, and one spoke 11 can be provided with a continuous external edge 22 suitable to be located entirely in contact with the internal lateral wall of a container, or tub, and remove the compound from it effectively.

According to further embodiments, all the spokes 11 can be provided with respective grooves 26 and/or extensions 27.

If two or more spokes 11 are provided with grooves 26, the latter will be offset in height with respect to each other, so as to guarantee the correct removal of the compound from the lateral walls of the tub, or container.

Figure 7:
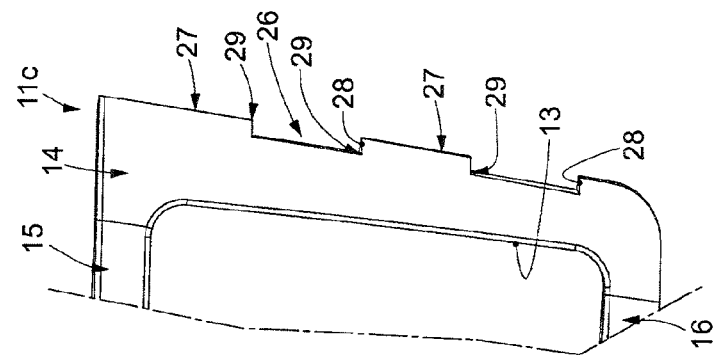
Figure 6:
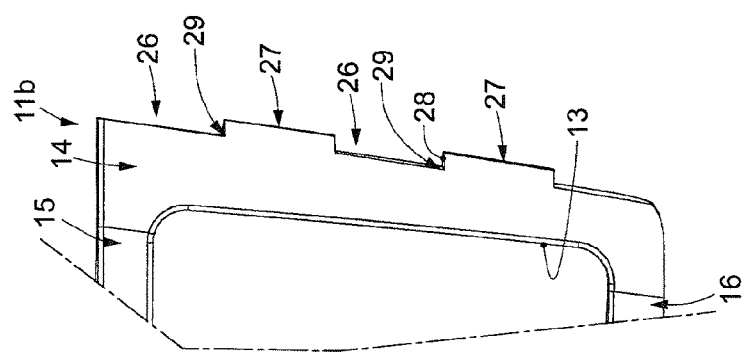
Figure 5:
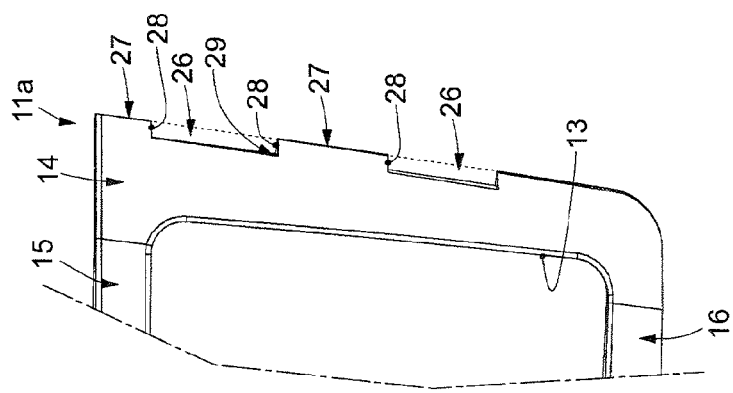

FIGS. 5 to 7 show by way of example the lateral fins 14 of respective spokes 11a, 11b, 11c of a mixing device 10 provided with respective grooves 26 and extensions 27.

As can be seen, the grooves of one spoke 11a, 11b, 11c are offset with respect to the grooves 26 of the other spokes 11b, 11c, 11a, so as to follow autonomous circumferential paths and guarantee, during use, the correct removal of the compound from the lateral walls of the container.

It is clear that modifications and/or additions of parts may be made to the mixing device 10 as described heretofore, without departing from the field and scope of the present invention.

It is also clear that, although the present invention has been described with reference to some specific examples, a person of skill in the art shall certainly be able to achieve many other equivalent forms of mixing device 10, having the characteristics as set forth in the claims and hence all coming within the field of protection defined thereby.

The invention claimed is:

1. A mixing device suitable to mix substances or liquid or semi-liquid compounds to increase the volume thereof, comprising:
a hub which develops along a central axis and three mixing spokes connected to the hub, wherein each of said spokes comprises an external lateral fin and two upper and lower connection segments, which connect respective upper and lower ends of said lateral fin to said hub, and wherein said lateral fins and said upper and lower connection segments have respective longitudinal axes of development inclined with respect to each other and/or with respect to said central axis, wherein said spokes develop, with respect to the central axis, in a truncated cone-shaped volume and said fins have respective external edges lying on a common truncated cone-shaped surface, with a shape flared between said lower connection segment and said upper connection segment and the lateral fin of at least one spoke lies on a vertical lying plane inclined with respect to said central axis by an angle of vertical inclination comprised between 2° and 10°.

2. The mixing device as in claim 1, wherein said external edges have a flaring angle comprised between 1° and 15° with respect to said central axis.

3. The mixing device as in claim 1, wherein said external edges have a flaring angle comprised between 5° and 10° with respect to said central axis.

4. The mixing device as in claim 1, wherein said spokes each have an internal through aperture delimited by said connection segments, by said lateral fin and by said hub suitable to allow, during use, the passage of the substances or the compound.

5. The mixing device as in claim 1, wherein the lateral fin of at least one spoke lies on a vertical lying plane inclined with respect to said central axis by an angle of vertical inclination comprised between 4° and 8°.

6. The mixing device as in claim 1, wherein said upper and lower connection segments of at least one spoke are angled with respect to each other by an angle of horizontal inclination comprised between about 15° and about 25°.

7. The mixing device as in claim 5, wherein said upper and lower connection segments of at least one spoke are angled with respect to each other by an angle of horizontal inclination comprised between about 18° and about 22°.

8. The mixing device as in claim 1, wherein said mixing spokes are disposed sequentially and angled by an angle of 120° with respect to said central axis.

9. The mixing device as in claim 1, wherein at least one spoke is provided with grooves and/or extensions made in an external edge of the respective lateral fin, defining passage channels configured to promote the generation of bubbles with small sizes, suitable to increase the volume of the substances and of the compound to mix.

10. The mixing device as in claim 9, wherein said passage channels have squared corners.

11. The mixing device as in claim 9 wherein said grooves and/or extensions are provided on the lateral fins of at least two spokes, said grooves and/or extensions on one spoke being located offset with respect to the grooves and/or extensions on the at least one other spoke along the longitudinal development of the lateral fins.

12. The mixing device as in claim 1, wherein said upper and lower connection segments are angled with respect to the respective lateral fin, defining with respect to each other respective included angles, comprised between 150° and 180°.

13. The mixing device as in claim 1, wherein at least one of either said upper or lower connection segments has a shape tapered from said hub toward said fin.

14. A machine to prepare ice-cream comprising a truncated cone-shaped container in which the ingredients are disposed, a cooling circuit to cool the container, a motor member and a mixing device as in claim 1 disposed in said container, wherein the hub is connected to a drive shaft of the motor member in order to be made to rotate around said central axis, and said lateral wings are each located at least partly in contact with the internal lateral walls of the container.

15. The machine as in claim 14, wherein said central axis of rotation is inclined by an angle comprised between 1° and 20° with respect to a horizontal plane.

* * * * *